US010549469B2

(12) United States Patent
Ha et al.

(10) Patent No.: US 10,549,469 B2
(45) Date of Patent: Feb. 4, 2020

(54) EXTRUSION MOLDING APPARATUS FOR LIGHT GUIDE PLATE OF DISPLAY DEVICE AND METHOD OF FABRICATING LIGHT GUIDE PLATE OF DISPLAY DEVICE USING THE SAME

(71) Applicant: SAMSUNG DISPLAY CO., LTD., Yongin-si, Gyeonggi-do (KR)

(72) Inventors: Juhwa Ha, Seoul (KR); Jiwon Lee, Suwon-si (KR); Sangho Hwang, Suwon-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 219 days.

(21) Appl. No.: 15/830,257

(22) Filed: Dec. 4, 2017

(65) Prior Publication Data

US 2018/0154569 A1    Jun. 7, 2018

(30) Foreign Application Priority Data

Dec. 5, 2016   (KR) .................. 10-2016-0164534

(51) Int. Cl.
*B29D 11/00*  (2006.01)
*B29C 48/30*  (2019.01)
(Continued)

(52) U.S. Cl.
CPC ............ *B29C 48/30* (2019.02); *B29C 48/313* (2019.02); *B29D 11/00663* (2013.01);
(Continued)

(58) Field of Classification Search
CPC . B29C 48/30; B29C 48/313; B29D 11/00663; G02B 6/0046; G02B 6/0065
See application file for complete search history.

(56) References Cited

U.S. PATENT DOCUMENTS 5,234,649 A * 8/1993 Cloeren ................. B29C 48/30
                                                264/173.16
5,494,429 A * 2/1996 Wilson .................... B29C 48/30
                                                425/192 R
(Continued)

FOREIGN PATENT DOCUMENTS

KR   1020100000799 A   1/2010
KR   1020100058565 A   6/2010
(Continued)

*Primary Examiner* — Mathieu D Vargot
(74) *Attorney, Agent, or Firm* — Cantor Colburn LLP (57) ABSTRACT

An extrusion molding apparatus for a light guide plate of a display device includes: a first surface of a first body and a second surface of a second body facing each other, the first body including a first side opposite to a second side thereof in a first direction, and a gap between the first and second surfaces, from which a light guide plate material is discharged along a second direction crossing the first direction. In the second direction, each of the first and second surfaces includes, in order: a first land portion; a manifold portion at a height different from the height of a first land portion; and a discharge portion from which the light guide plate material is discharged from the extrusion molding apparatus. Along the first direction, the gap at the discharge portion increases, and a width of the manifold portion in the second direction increases.

16 Claims, 7 Drawing Sheets

(51) Int. Cl.
*F21V 8/00* (2006.01)
*B29C 48/31* (2019.01)
*B29K 33/00* (2006.01)
*B29K 69/00* (2006.01)

(52) U.S. Cl.
CPC ......... *G02B 6/0046* (2013.01); *G02B 6/0065* (2013.01); *B29K 2033/12* (2013.01); *B29K 2069/00* (2013.01)

(56) References Cited

U.S. PATENT DOCUMENTS

| | | |
|---|---|---|
| 8,334,948 B2 | 12/2012 | Kim et al. |
| 8,534,899 B2 | 9/2013 | Yu et al. |
| 2010/0059903 A1* | 3/2010 | Elgindi ................. B29C 48/305 264/176.1 |
| 2010/0213632 A1 | 8/2010 | Katsumoto et al. |
| 2013/0259965 A1* | 10/2013 | Cloeren ................. B29C 48/08 425/190 |

FOREIGN PATENT DOCUMENTS

| | | |
|---|---|---|
| KR | 101202956 B1 | 11/2012 |
| KR | 1020140125106 A | 10/2014 |

\* cited by examiner

EXTRUSION MOLDING APPARATUS FOR LIGHT GUIDE PLATE OF DISPLAY DEVICE AND METHOD OF FABRICATING LIGHT GUIDE PLATE OF DISPLAY DEVICE USING THE SAME

This application claims priority to Korean Patent Application No. 10-2016-0164534, filed on Dec. 5, 2016, and all the benefits accruing therefrom under 35 U.S.C. § 119, the content of which in its entirety is herein incorporated by reference.

BACKGROUND

1. Field

Embodiments of the invention relate to a light guide plate extrusion molding apparatus, and more particularly, to an extrusion molding apparatus for a light guide plate of a display device capable of manufacturing a light guide plate having a triangular cross-section.

2. Discussion of the Related Art

Liquid crystal display ("LCD") devices include two substrates on which electrodes are formed and a liquid crystal layer interposed therebetween.

In addition, the LCD device includes a backlight unit for providing light to the substrates.

The backlight unit can be classified into a direct type, an edge type and a corner type depending on the position of a light source.

An edge-type backlight unit includes a light guide plate for guiding light from the light source to the substrate.

SUMMARY

Embodiments of the invention may be directed to an extrusion molding apparatus for a light guide plate of a display device capable of manufacturing a light guide plate having a triangular cross-section.

According to an exemplary embodiment, an extrusion molding apparatus for a light guide plate of a display device includes: a first body and a second body facing each other to dispose a first surface of the first body facing a second surface of the second body, the first body including a first side surface disposed opposite to a second side surface thereof in a first direction, and a gap defined between the first and second surfaces facing each other, from which a light guide plate material forming the light guide plate of the display device is discharged from the extrusion molding apparatus along a second direction crossing the first direction, In the second direction, each of the first and second surfaces includes, in order: a hanger portion; a first land portion disposed at a height different from a height of the hanger; a manifold portion disposed at a height different from the height of the first land portion; and a discharge portion from which the light guide plate material is discharged from the extrusion molding apparatus. Along the first direction, the gap at the discharge portion increases, and a width of the manifold portion in the second direction increases.

From a central portion of the first body in the first direction, a width of the first land portion in the second direction may decrease along the first direction and along a direction opposite to the first direction.

A width of the first land portion at the first side surface of the first body may be larger than a width of the first land portion at the second side surface of the first body.

Along the first direction, a width of the second land portion in the second direction may decrease.

The manifold portion may include a first side corresponding to the first side surface of the first body, a second side corresponding to the second side surface of the first body and a third side adjacent to the second land portion. An angle between the first side and the third side may be an obtuse angle.

An angle between the second side and the third side may be an acute angle.

The hanger of one of the first and second bodies is closer to the other one of the first and second bodies than the first land portion to be located higher than the first land portion.

The first land portion of one of the first and second bodies is closer to the other one of the first and second bodies than the manifold portion to be located higher than the manifold portion.

The second land portion of one of the first and second bodies is closer to the other one of the first and second bodies than the manifold portion to be located higher than the manifold portion.

The extrusion molding apparatus for a light guide plate of a display device may further include: a first side cover located on the first side surface of the first body; and a second side cover located on the second side surface of the first body.

The foregoing is illustrative only and is not intended to be in any way limiting. In addition to the illustrative features, exemplary embodiments and features described above, further features, exemplary embodiments and features will become apparent by reference to the drawings and the following detailed description.

BRIEF DESCRIPTION OF THE DRAWINGS

A more complete appreciation of the invention will become more apparent by describing in detail exemplary embodiments thereof with reference to the accompanying drawings, where.

DETAILED DESCRIPTION

Exemplary embodiments will now be described more fully hereinafter with reference to the accompanying drawings. Although the invention may be modified in various manners and have several exemplary embodiments, exemplary embodiments are illustrated in the accompanying drawings and will be mainly described in the specification. However, the scope of the invention is not limited to the exemplary embodiments and should be construed as including all the changes, equivalents and substitutions included in the spirit and scope of the invention.

In the drawings, thicknesses of a plurality of layers and areas are illustrated in an enlarged manner for clarity and ease of description thereof. When a layer, area, or plate is referred to as being related to another elements such as being "on" or "below" another layer, area, or plate, it may be directly on the other layer, area, or plate, or intervening layers, areas, or plates may be present therebetween. Conversely, when a layer, area, or plate is referred to as being related to another element as being "directly on" or "directly below" another layer, area, or plate, intervening layers, areas, or plates may be absent therebetween.

The spatially relative terms "below," "beneath," "lower," "above," "upper" and the like, may be used herein for ease of description to describe the relations between one element or component and another element or component as illustrated in the drawings. It will be understood that the spatially relative terms are intended to encompass different orientations of the device in use or operation, in addition to the orientation depicted in the drawings. For example, in the case where a device illustrated in the drawing is turned over, the device positioned "below" or "beneath" another device may be placed "above" another device. Accordingly, the illustrative term "below" may include both the lower and upper positions. The device may also be oriented in the other direction and thus the spatially relative terms may be interpreted differently depending on the orientations.

Throughout the specification, when an element is referred to as being "connected" to another element, the element is "mechanically connected" or "physically connected" to the other element, or "electrically connected" to the other element with one or more intervening elements interposed therebetween.

The terminology used herein is for the purpose of describing particular embodiments only and is not intended to be limiting. As used herein, the singular forms "a," "an," and "the" are intended to include the plural forms, including "at least one," unless the content clearly indicates otherwise. "At least one" is not to be construed as limiting "a" or "an." "Or" means "and/or." As used herein, the term "and/or" includes any and all combinations of one or more of the associated listed items. It will be further understood that the terms "comprises," "including," "includes" and/or "including," when used in this specification, specify the presence of stated features, integers, steps, operations, elements and/or components, but do not preclude the presence or addition of one or more other features, integers, steps, operations, elements, components and/or groups thereof.

It will be understood that, although the terms "first," "second," "third," and the like may be used herein to describe various elements, these elements should not be limited by these terms. These terms are only used to distinguish one element from another element. Thus, "a first element" discussed below could be termed "a second element" or "a third element," and "a second element" and "a third element" may be termed likewise without departing from the teachings herein.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" may mean within one or more standard deviations, or within ±30%, 20%, 10%, 5% of the stated value.

Unless otherwise defined, all terms used herein (including technical and scientific terms) have the same meaning as commonly understood by those skilled in the art to which this invention pertains. It will be further understood that terms, such as those defined in commonly used dictionaries, should be interpreted as having a meaning that is consistent with their meaning in the context of the relevant art and will not be interpreted in an ideal or excessively formal sense unless clearly defined in the present specification.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Some of the parts which are not associated with the description may not be provided in order to specifically describe embodiments of the invention and like reference numerals refer to like elements throughout the specification.

Hereinafter, a light guide plate extrusion molding apparatus according to one or more exemplary embodiment will be described in detail with reference to FIGS. 1, 2, 3, 4, 5, 6, 7, 8, 9 and 10.

Figure 1:
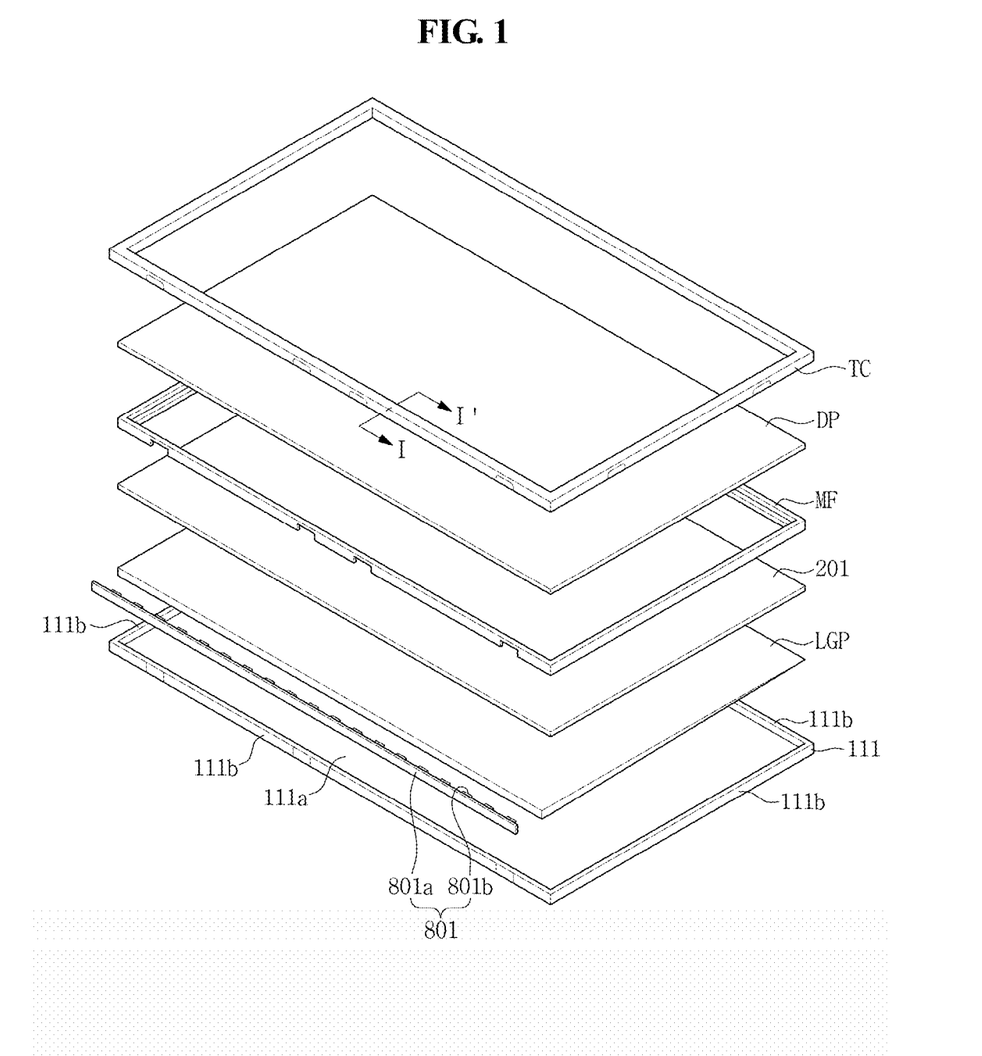
FIG. 1 is an exploded perspective view illustrating an exemplary embodiment of a display device according to the invention.
Figure 2:
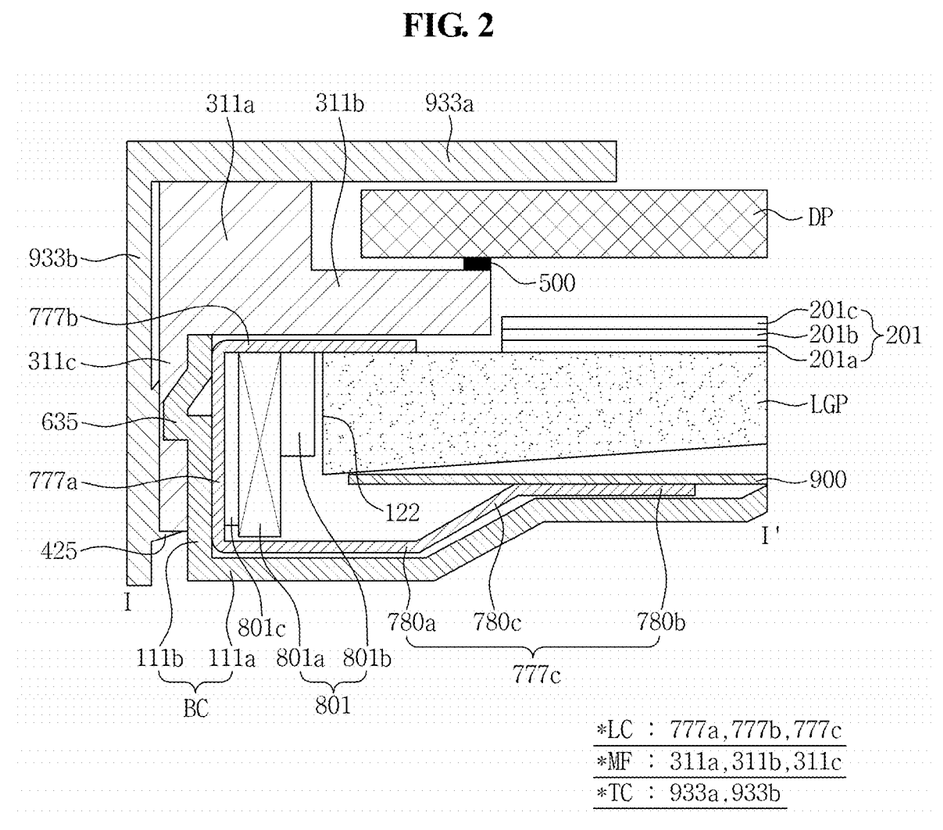
FIG. 2 is a cross-sectional view taken along line I-I' of FIG. 1.

FIG. 1 is an exploded perspective view illustrating an exemplary embodiment of a display device according to the invention and FIG. 2 is a cross-sectional view taken along line I-I' of FIG. 1.

The display device according to an exemplary embodiment includes a bottom case BC, a reflective plate 900, a light guide plate LGP, an optical sheet (member) 201, a light source portion 801, a light source cover LC, a mold frame MF, a display panel DP and a top case TC, as illustrated in FIGS. 1 and 2.

Herein, the reflective plate 900, the light guide plate LGP, the optical sheet 201, the light source portion 801, the light source cover LC and the mold frame MF are included in a backlight unit. In an exemplary embodiment, the display panel DP and the backlight unit are assembled in a stacked state to constitute a display module. The display module may further include the top case TC, the bottom case BC and a driving circuit board (not illustrated). The top case TC and the bottom case BC may protect and fasten the display panel DP and the backlight unit within the display device, and the driving circuit board (not illustrated) may drive the display panel DP to generate and display an image. The display device and components thereof may be disposed in a plane defined by first and second directions crossing each other. A thickness of the display device and components thereof may be defined in a third direction crossing each of the first and second directions. A vertical direction in FIG. 2 may represent the third (thickness) direction, while a horizontal direction in FIG. 2 may represent the first or second direction.

The bottom case BC has an accommodation space defined therein. The reflective plate 900, the light guide plate LGP, the optical sheet 201, the light source portion 801 and the light source cover LC may be disposed in the accommodation space. To secure the accommodation space, the bottom case BC may include a bottom portion 111*a* and a side portion 111*b* provided in plurality. In an exemplary embodiment, for example, the bottom portion 111*a* may have a quadrangular shape and the side portions 111*b* protrude from respective edges of the bottom portion 111*a* to have a predetermined height therefrom. Ends or edges of the side portions 111*b* that are adjacent to each other are connected to each other. A space defined by the side portions 111*b* connected to each other, and the bottom portion 111*a* from which the side portions 111*b* protrude, corresponds to the accommodation space.

In an exemplary embodiment, a locking projection 635 may be disposed or formed at an outer side of the side portions 111*b* which face each other with respect to the accommodation space therebetween. The mold frame MF is fastened to the bottom case BC by the locking projection 635. The locking projection 635 may be formed by a portion of a corresponding one of the side portions 111*b* being bent from a remaining portion thereof, to protrude toward the mold frame MF relative to the remaining portion of the corresponding side portion 111*b*.

The light source portion 801, which is an element for producing and emitting a light, may include a printed circuit board ("PCB") 801*a* and a light source 801*b* disposed on the PCB 801*a*, as illustrated in FIG. 2. The light source 801*b* may be provided in plurality on the PCB 801*a*, as illustrated in FIG. 1.

One surface of the PCB 801*a* may be divided into a mounting area and a wiring area, although not illustrated. In the case where two or more light sources 801*b* are provided, one light source may be disposed at each of a mounting area, and a plurality of wirings for applying a driving power to the light sources 801*b* are disposed at the wiring area. The driving power is generated from an external power supply (not illustrated) and then applied to the plurality of wirings through a separate connector (not illustrated), to drive the light source portion 801 to generate and emit light toward the light guide plate LGP.

The light source 801*b* generates and emits a light to outside the light source portion 801 and is connected to the PCB 801*a*. The light source 801*b* may be a light emission package including at least one light emitting diode ("LED"). As an example, the light emission package may include therein red, green and/or blue LEDs, respectively generating and/or emitting red, green and/or blue lights. The light emission package may combine the lights of the three colors to produce a white light and emit the white light to outside the light source portion 801. As another example, the light emission package may only include a blue LED among the LEDs of three colors described above. In such an exemplary embodiment, fluorescent materials (e.g., phosphors), configured to convert a blue light into a white light, may be included at a light emission portion of the blue LED. The light emitted from the light source 801*b* is incident to the light guide plate LGP.

As illustrated in FIGS. 1 and 2, the light guide plate LGP may have a polyhedral shape. One of a plurality of surfaces included in or defined by the light guide plate LGP that faces the light source 801*b* may be referred to as a light incident surface 122. A surface among the plurality of surfaces included in or defined by the light guide plate LGP that faces the display panel DP may be a light emission surface of the light guide plate LGP. A surface that faces the reflective plate 900 may be a rear or lower outer surface of the light guide plate LGP. A surface that connects the light emission surface and the lower outer surface to each other, may be a side surface, and may include the light incident surface 122.

When one of the aforementioned side portions 111*b* that is closest to the light source portion 801 is defined as a first side portion, and another of the aforementioned side portions 111*b* that faces the first side portion with respect to the accommodation space is defined as a second side portion, the light guide plate LGP has a thickness gradually decreasing from the first side portion 111*b* toward the second side portion 111*b*. Such a light guide plate LGP may have a triangular cross-section. In such an exemplary embodiment, the light incident surface 122 of the light guide plate LGP, among the side surfaces thereof, has a largest thickness.

A light emitted from the light source 801*b* is incident to the light incident surface 122 and then propagates toward and within the inside of the light guide plate LGP. The light guide plate LGP totally reflects the light reaching the inside the light guide plate LGP to be guided toward the display panel DP, such as toward a display area of the display panel DP at which an image is displayed.

In an exemplary embodiment, although not illustrated, a plurality of scattering patterns may be disposed or formed on a lower outer surface of the light guide plate LGP to improve reflectivity of the light guide plate LGP. The scattering patterns may include a discrete pattern provided in plurality. In such an exemplary embodiment, the plurality of scattering patterns may have a gradually larger gap therebetween, as a distance from the light incident surface 122 of the light guide plate LGP increases.

The light guide plate LGP may include a light transmissive material such as acrylic resins, e.g., polymethyl methacrylate ("PMMA") and/or polycarbonate ("PC") so as to effectively guide the light therein.

The reflective plate 900 is disposed below the light guide plate LGP. The reflective plate 900 may re-reflect a light having passed through the lower outer surface of the light guide plate LGP and dissipated to outside the light guide plate LGP, back toward the light guide plate LGP, thus significantly reducing a loss of light.

The optical sheet 201 may diffuse and collimate the light transmitted from the light guide plate LGP through the light emission surface thereof. The optical sheet 201 is disposed between the light guide plate LGP and the display panel DP, as illustrated in FIGS. 1 and 2. The optical sheet 201 may include a collection of individual member such as a diffusion sheet 201*a*, a light collimation sheet 201*b* and a protective sheet 201*c*. The diffusion sheet 201*a*, the light collimation sheet 201*b* and the protective sheet 201*c* are sequentially stacked on the light guide plate LGP in the order listed.

The diffusion sheet 201*a* diffuses the light guided from the light guide plate LGP to substantially reduce or effectively prevent partial concentration of the light.

The light collimation sheet 201*b* is disposed on the diffusion sheet 201*a* and serves to collimate the light diffused by the diffusion sheet 201a in a direction substantially perpendicular to the display panel DP. To this end, prisms (not illustrated) having a triangular cross-section may be disposed on a surface of the light collimation sheet 201b in a predetermined arrangement.

The protective sheet 201c is disposed on the light collimation sheet 201b and serves to protect a surface of the light collimation sheet 201b and diffuse the light transmitted therethrough to achieve uniform light distribution. The light having passed through the protective sheet 201c is provided to the display panel DP.

As illustrated in FIG. 2, the light source cover LC covers one side of the light guide plate LGP so that the light source portion 801 and the light incident surface 122 may be disposed at an accommodation space thereinside. The light source cover LC aligns the light incident surface 122 and the light source 801b with each other so that the light emitted from the light source 801b may be precisely irradiated to the light incident surface 122 of the light guide plate LGP.

The light source cover LC may include a metal material, e.g., stainless steel.

The light source cover LC may include a light source mounting portion 777a, an upper cover 777b and a lower cover 777c.

The upper cover 777b extends from an edge of a first side of the light source mounting portion 777a toward an upper outer surface (e.g., the light emission surface) of the light guide plate LGP.

The lower cover 777c extends from an edge of a second side of the light source mounting portion 777a opposite to the first side thereof, toward the lower outer surface of the light guide plate LGP. The lower cover 777c may have any suitable shape in accordance with a shape of the bottom portion 111a of the bottom case BC. In an exemplary embodiment, for example, as illustrated in FIG. 2, the lower cover 777c may include a first horizontal portion 780a extending from the second side of the light source mounting portion 777a to have a predetermined length therefrom along the first (or second) direction, a second horizontal portion 780b disposed closer to a lower surface of the light guide plate LGP than the first horizontal portion 780a, and an inclined portion 780c connecting the first and second horizontal portions 780a and 780b to each other.

The light source 801b and the PCB 801a are disposed in an accommodation space surrounded and defined by the light source mounting portion 777a, the upper cover 777b and the lower cover 777c. In such an exemplary embodiment, an adhesive member 801c is provided on one of facing surfaces between a rear surface of the PCB 801a opposite to the surface on which the light source 801b is disposed, and the light source mounting portion 777a. The light source portion 801 may be attached to the light source mounting portion 777a by the adhesive member 801c. In an exemplary embodiment, for example, the adhesive member 801c may be a double-sided tape, without being limited thereto. In such an exemplary embodiment, the light source portion 801 may be disposed or formed in a state where one adhesive surface of the double-side tape is attached to the PCB 801a.

In a state of being fastened to the bottom case BC, the mold frame MF supports the display panel DP and the top case TC thereon, and maintains a uniform gap between the display panel DP and the optical sheet 201. To this end, the mold frame MF may have a quadrangular frame shape including a first support 311a, a second support 311b and a third support (fastening portion) 311c. The first through third supports 311a to 311c may be disposed in plural to respectively correspond to the side portions 111b of the bottom case BC.

In a state of being located on the plurality of side portions 111b, the first support 311a supports thereon the top case TC which covers the first support 311a from thereabove.

The second support 311b extends from an inner edge of the first support 311a toward the optical sheet 201. The second support 311b has a height less than a height of the first support 311a. That is, an uppermost surface of the second support 311b may be further from a common reference such as the bottom portion 111a, than an uppermost surface of the first support 311a. Due to the height difference between the upper surfaces of the first and second supports 311a and 311b, a space is defined between the top case TC and the second support 311b, and an edge portion of the display panel DP is located in the space. In such an exemplary embodiment, a buffer pad 500 may be further disposed or formed at an end portion (e.g., distal end) of the second support 311b, to protrude from the end portion of the second support 311b toward the display panel DP. The edge portion of the display panel DP is located on the buffer pad 500. The buffer pad 500 serves to substantially reduce or effectively prevent a direct contact between the display panel DP and the second support 311b, thereby substantially reducing or effectively preventing scratching of the display panel DP.

The fastening member 311c extends from a lower surface of the first support 311a toward the corresponding side portion 111b. A coupling groove in which the locking projection 365 is received, is defined open at an inner side surface of the fastening member 311c (e.g., one of the inner side surfaces of the fastening member 311c that faces the locking projection 635). The mold frame MF may be fastened to the bottom case BC by the locking projection 635 inserted into the coupling groove.

The top case TC may have a quadrangular frame shape having an opening defined at a central portion thereof. The top case TC is located above the display panel DP. A display area of the display panel DP is exposed to outside the display device through the opening of the top case TC. The top case TC covers an edge portion of the display panel DP, upper and side surfaces of the first support 311a of the mold frame MF, and a side surface of the fastening member 311c of the mold frame MF. The edge portion of the display panel DP may define a non-display area at which an image is not displayed or is not visible from outside the display device.

To this end, the top case TC includes a front surface cover 933a which covers the edge portion of the display panel DP and the upper surface of the first support 311a, and a side surface cover 933b which covers the side surface of the first support 311a and the side surface of the fastening member 311c. The front surface cover 933a and the side surface cover 933b may be provided in plurality. In an exemplary embodiment, a hook 425 may be defined or formed protruded from inside the side surface cover 933b, and the hook 425 contacts a lower surface of the fastening member 311c of the mold frame MF. The top case TC may be fastened to the mold frame MF by the hook 425. In addition, an opening (not illustrated) may be defined in a portion one of the side surface covers 933b. A PCB (not shown) may be exposed outside the top case TC through the opening.

The display panel DP receives an image data signal from a controller (not illustrated) and the light from the backlight unit to generate and display an image. As illustrated in FIG. 1, the display panel DP may have a quadrangular (e.g., rectangular) shape.

Figure 3:
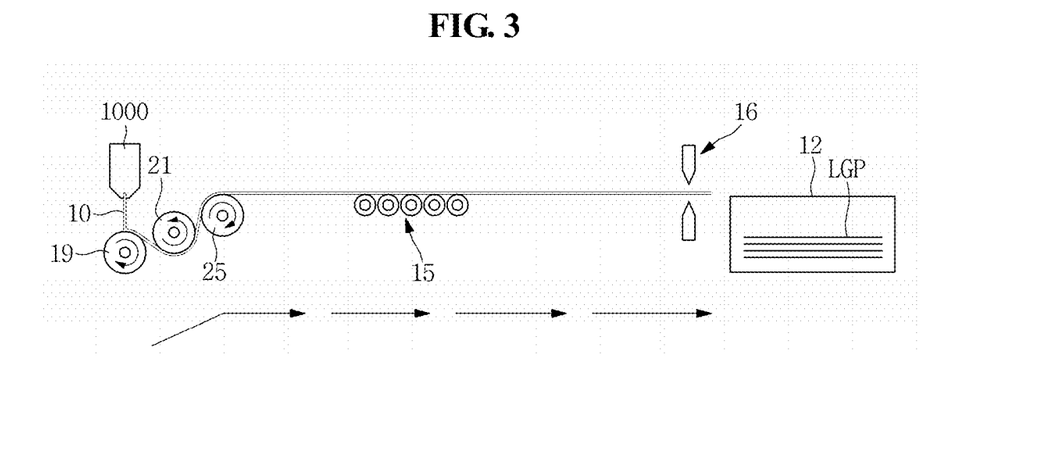
FIG. 3 is a cross-sectional side view illustrating an exemplary embodiment of a light guide plate manufacturing apparatus for manufacturing the light guide plate of FIG. 1.

FIG. 3 is a cross-sectional side view illustrating an exemplary embodiment of a light guide plate manufacturing apparatus for manufacturing the light guide plate of FIG. 1.

As illustrated in FIG. 3, the light guide plate manufacturing apparatus includes an extrusion molding apparatus 1000, a first roll 19, a second roll 21, a third roll 25, a cooler 15 and a cutter 16.

The extrusion molding apparatus 1000 receives a thermoplastic resin material in a gel state (e.g., an acrylic resin such as PMMA) and extrudes the thermoplastic resin material so as to produce a light guide plate base 10 (e.g., a mother plate for forming one or more light guide plate therefrom) having a predetermined thickness. This light guide plate base 10 has a triangular cross-section, as illustrated in FIG. 2.

The light guide plate base 10 from the extrusion molding apparatus 1000 moves to the cooler 15 by the first roll 19, the second roll 21 and the third roll 25. The first roll 19 and the second roll 21 rotate in opposite directions, and the first roll 19 and the third roll 25 rotate in a substantially same direction. In an exemplary embodiment, for example, each of the first roll 19 and the third roll 25 rotates in a clockwise direction, and the second roll 21 rotates in a counterclockwise direction.

The light guide plate base 10 having passed through the cooler 15 is transferred to the cutter 16. The light guide plate base 10 is cut to a predetermined length by the cutter 16. One piece of the light guide panel base 10 cut to a predetermined length by the cutter 16 corresponds to one light guide plate LGP.

The plurality of light guide plates LGP cut to have a predetermined length by the cutter 16 are stacked on a pallet 12 or the like and transferred to a loading place (not illustrated).

Hereinafter, the extrusion molding apparatus 1000 will be described in detail.

Figure 4:
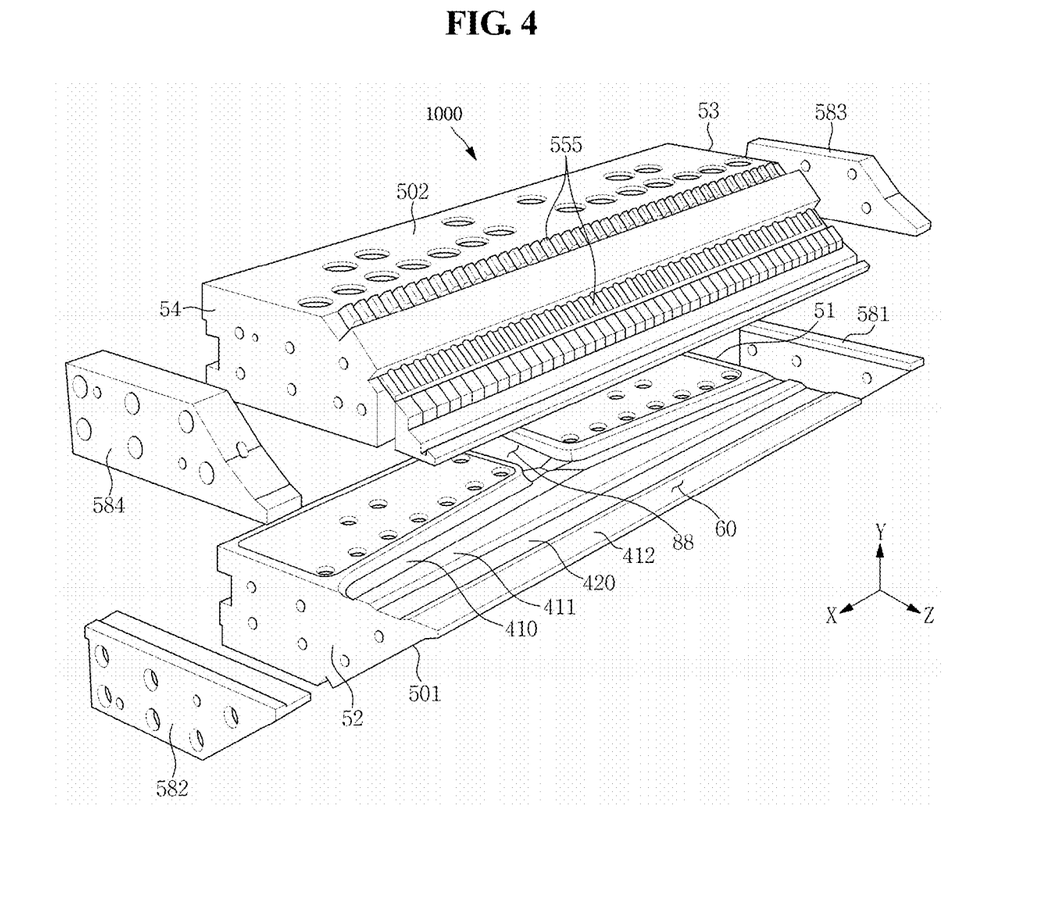
FIG. 4 is an exploded perspective view illustrating an exemplary embodiment of an extrusion molding apparatus of FIG. 3.
Figure 5:
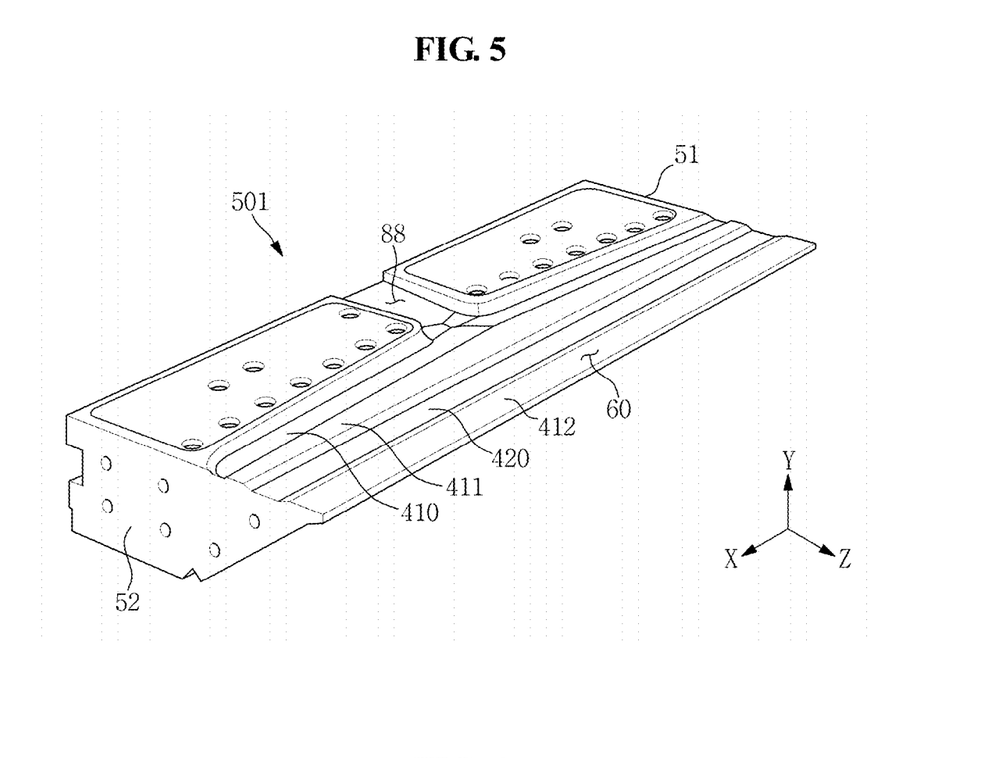
FIG. 5 is an enlarged view illustrating an exemplary embodiment of a first body of the extrusion molding apparatus of FIG. 4.

FIG. 4 is an exploded perspective view illustrating an exemplary embodiment of an extrusion molding apparatus of FIG. 3, and FIG. 5 is an enlarged view illustrating a first body of the extrusion molding apparatus of FIG. 4.

As illustrated in FIG. 4, the extrusion molding apparatus 1000 includes a first body 501, a second body 502, a resin (material) injection portion 88, a hanger 410, a first land portion 411, a manifold portion 420, a second land portion 412, a discharge portion 60, a discharge portion adjusting bolt 555, a first side cover 581, a second side cover 582, a third side cover 583 and a fourth side cover 584.

The first body 501 and the second body 502 face each other in a third direction (hereinafter "a Y-axis direction").

The resin injection portion 88, the hanger 410, the first land portion 411, the manifold portion 420 and the second land portion 412 are located on facing surfaces of the first body 501 and the second body 502. In an exemplary embodiment, for example, when the facing surfaces of the first body 501 and the second body 502 are defined as a first surface and a second surface, respectively, the resin injection portion 88, the hanger 410, the first land portion 411, the manifold portion 420 and the second land portion 412 are located at the first surface of the first body 501 such as to collectively form the first surface of the first body 501. In addition, although not illustrated, the resin injection portion 88, the hanger 410, the first land portion 411, the manifold portion 420 and the second land portion 412 are located at the second surface of the second body 502 such as to collectively form the second surface of the second body 502.

A resin for forming a light guide plate is injected into the extrusion molding apparatus 100 through the resin injection portion 88. With the first and second bodies 501 and 502 facing each other, the resin (material) injected into the resin injection portion 88 moves sequentially through or over the hanger 410, the first land portion 411, the manifold portion 420 and the second land portion 412 of the facing bodies, in a flow direction. In such an exemplary embodiment, from an area of the extrusion molding apparatus 1000 at which the resin injection portion 88 is defined, the resin at each of the hanger 410, the first land portion 411, the manifold portion 420 and the second land portion 412 is diffused in a direction opposite to a first direction (hereinafter, "an X-axis direction") and in the X-axis direction toward a first side surface 51 and a second side surface 52 of the first body 501, respectively, along the hanger 410, the first land portion 411, the manifold portion 420 and the second land portion 412. The resin injection portion 88 may be a single input to the injection molding apparatus 1000. In the X-axis direction, the resin injection portion 88 may have a maximum dimension smaller than a maximum dimension of the first body 501 (or the second body 502).

With the resin diffused in the directions along the hanger 410, the first land portion 411, the manifold portion 420 and the second land portion 412, the diffused resin between the first body 501 and the second body 502 is cured by heat and then discharged to the outside through the discharge portion 60 of the extrusion molding apparatus 1000. The cured resin is shaped so as to have a shape of the discharge portion 60 while passing through the discharge portion 60 to outside the extrusion molding apparatus 1000.

The discharge portion 60 is defined located between an end portion of the first land portion 411 and an end portion of the second land portion 412, along a second direction (hereinafter "a Z-axis direction"). The discharge portion 60 may be defined at a distal end of each of the first and second bodies 501 and 502, as ends thereof furthest in the Z-axis direction. In an exemplary embodiment, the discharge portion 60 is between facing second land portions 412 of the first and second bodies 501 and 502, the discharge portion 60 having a length along the X-axis direction. The resin is discharged to outside the extrusion molding apparatus 1000 through the discharge portion 60. The discharge portion 60 and/or the second land portion 412 may be considered as being located directly after or immediately following the manifold portion 420, in a flow direction of the resin. In such an exemplary embodiment, the resin is discharged to outside the extrusion molding apparatus 1000 through the discharge portion 60 in a direction parallel to the Z axis direction. The Z-axis direction corresponds to a flow direction through the extrusion molding apparatus 1000. The resin discharged to the outside corresponds to the light guide plate base 10 in FIG. 3.

A distance in the Y-axis direction between the first and second surfaces of the first and second bodies 501 and 502 facing each other defines a width of the discharge portion 60. The width of the discharge portion 60 at the first side surface 51, for a length defined between the end portion of the first land portion 411 and the end portion of the second land portion 412 in the Z-axis direction, is different from a width of the discharge portion 60 at the second side surface 52, for a length defined between the end portion of the first land portion 411 and the end portion of the second land portion 412 in the Z-axis direction.

The discharge portion adjusting bolt 555 is provided in plurality located at the second body 502, such as to be included therein. The discharge portion adjusting bolts 555 are arranged in a line in the X-axis direction along an upper surface of the second body 502. The discharge portion adjusting bolts 555 adjust a gap between the first and second bodies 501 and 502 (e.g., a width of the discharge portion 60) in the Y-axis direction. In an exemplary embodiment, for example, when a predetermined discharge portion adjusting bolt 555 is tightened, a gap of a portion of the discharge portion 60 located corresponding to the predetermined discharge portion adjusting bolt 555 is reduced. On the other hand, when a predetermined discharge portion adjusting bolt 555 is loosened, a gap of a portion of the discharge portion 60 located corresponding to the predetermined discharge portion adjusting bolt 555 is increased.

The hanger 410, the first land portion 411, the manifold portion 420 and the second land portion 412 described above have different heights from each other, with respect to a common reference such as a common plane. In an exemplary embodiment, for example, as illustrated in FIG. 5, among the hanger 410, the first land portion 411, the manifold portion 420 and the second land portion 412 of the first surface of the first body 501, the hanger 410 has a greatest height, and the manifold portion 420 has a smallest height. The first land portion 411 has a height less than the height of the hanger 410 and the second land portion 412 has a height less than the height of the first land portion 411. In an exemplary embodiment, the first land portion 411 may have a height substantially equal to a height of the hanger 410. In addition, the second land portion 412 may have a height substantially equal to a height of the first land portion 411. Since the manifold portion 420 has a smallest height, a surface of the manifold portion 420 defined in the X-axis and Z-axis directions may be considered as a height of "0" (zero), and the heights of the other portions may be referenced therefrom.

Although not illustrated, the hanger, the first land portion, the manifold portion and the second land portion located on the second surface of the second body 502 may have heights substantially equal to heights of respective corresponding ones of the hanger 410, the first land portion 411, the manifold portion 420 and the second land portion 412 located on the first surface of the first body 501, such that these portions are symmetrical with respect to the gap between the first and second bodies 501 and 502.

The first side cover 581 is connected to the first side surface 51 of the first body 501, and the second side cover 582 is connected to the second side surface 52 of the first body 501, to be disposed outside the first body 501. The first side surface 51 and the second side surface 52 face each other with respect to the first body 501 therebetween.

The third side cover 583 is connected to a third side surface 53 of the second body 502, and the fourth side cover 584 is connected to a fourth side surface 54 of the second body 502, to be disposed outside the second body 502. The third side surface 53 and the fourth side surface 54 face each other with respect to the second body 502 therebetween. The first and third side surfaces 51 and 53 are disposed at respective first ends of the bodies while the second and fourth side surfaces 52 and 54 are disposed at respective second ends of the bodies opposite to the first ends thereof.

Figure 6:
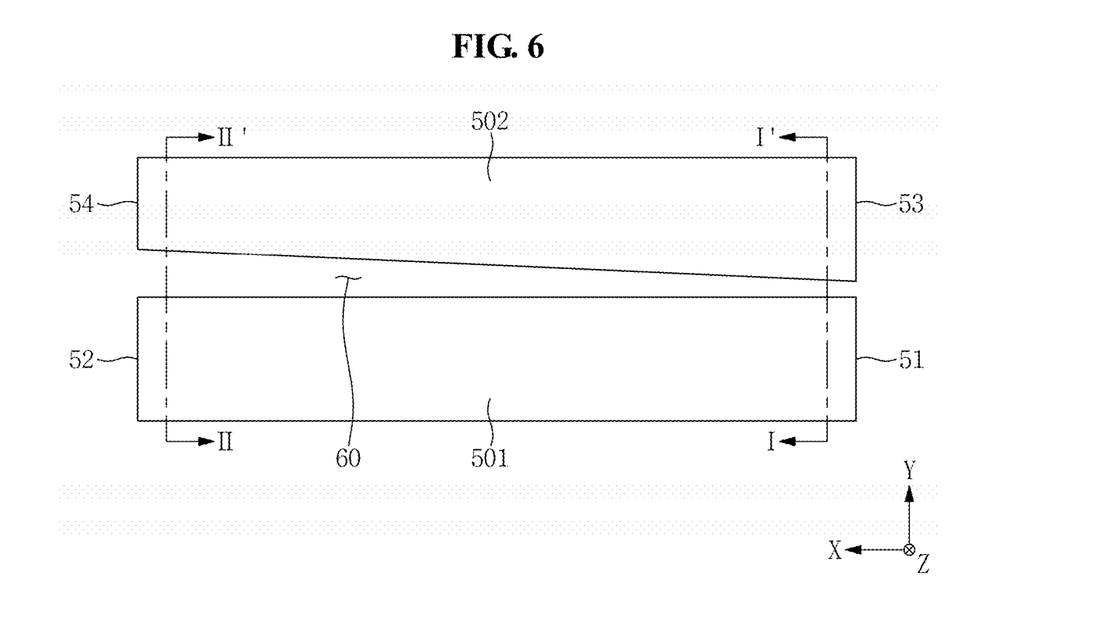
FIG. 6 is a schematic cross-sectional view illustrating a coupling relationship of the first body and the second body of the extrusion molding apparatus of FIG. 4.
Figure 7:
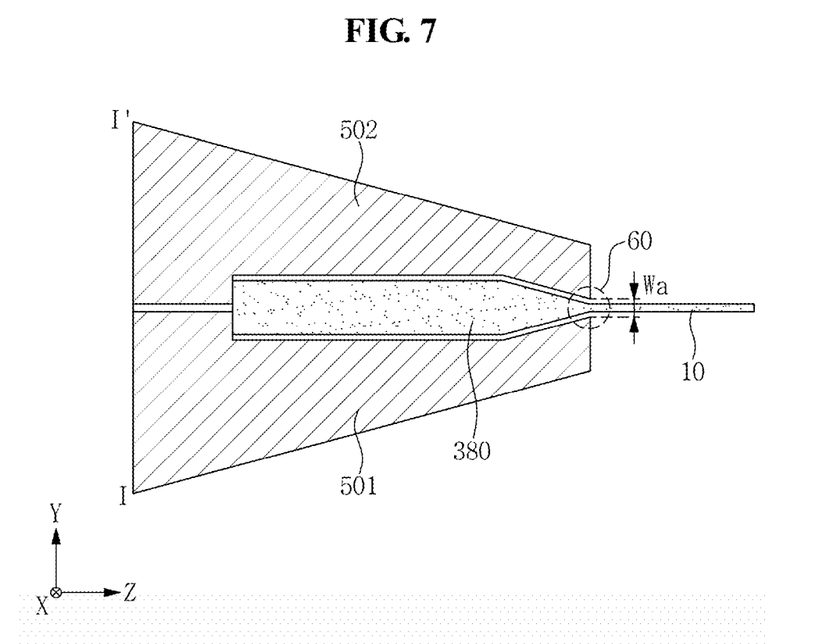
FIG. 7 is a cross-sectional view taken along line I-I' of FIG. 6.
Figure 8:
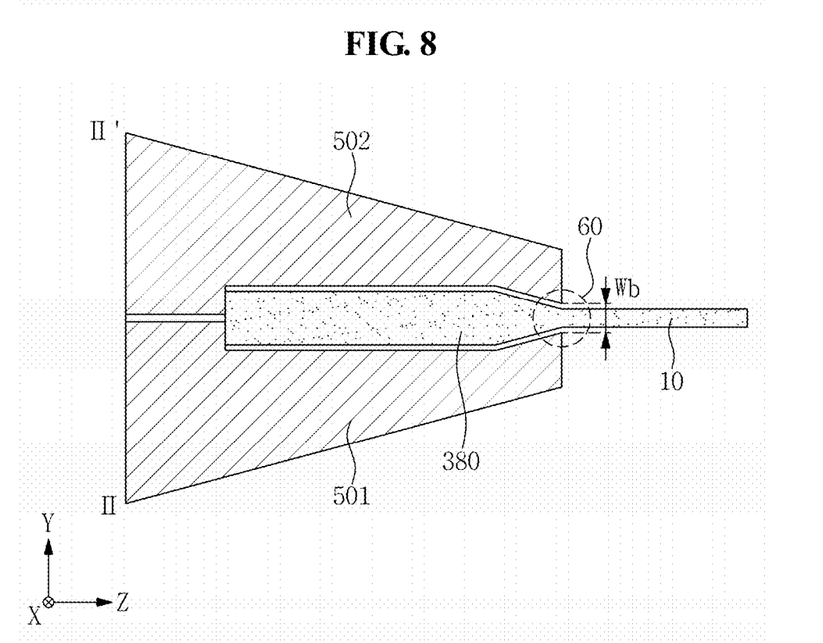
FIG. 8 is a cross-sectional view taken along line II-II' of FIG. 6.

FIG. 6 is a schematic cross-sectional view illustrating a coupling relationship of the first body and the second body of the extrusion molding apparatus of FIG. 4, FIG. 7 is a cross-sectional view taken along line I-I' of FIG. 6, and FIG. 8 is a cross-sectional view taken along line II-IP of FIG. 6.

When a direction from the first side surface 51 of the first body 501 toward the second side surface 52 of the first body 501 is defined as the first direction (e.g., "X-axis direction"), as illustrated in FIG. 6, the discharge portion 60 has a width in the third direction (e.g., "Y-axis direction") which gradually increases along the first direction. In other words, the discharge portion 60 has a width in the Y-axis direction which gradually increases along the X-axis direction. Referring back to FIG. 2, taken with FIG. 6, a right-to-left direction in FIG. 2 corresponds to the X-axis direction, while a vertical direction in FIG. 2 corresponds to the Y-axis direction.

Accordingly, as illustrated in FIG. 7, a portion of the discharge portion 60 closer to the first side surface 51, among the first side surface 51 and the second side surface 52 of the first body 501, has a relatively small width Wa. In addition, as illustrated in FIG. 8, a portion of the discharge portion 60 closer to the second side surface 52, among the first side surface 51 and the second side surface 52 of the first body 501, has a relatively large width Wb.

Due to the discharge portion 60 having such a structure, as illustrated in FIG. 7, the light guide plate base 10 having a relatively small thickness is discharged from the portion of the discharge portion 60 relatively close to the first side surface 51. In addition, as illustrated in FIG. 8, the light guide plate base 10 having a relatively large thickness is discharged from the portion of the discharge portion 60 relatively close to the second side surface 52. That is, an entirety of the light guide plate base 10 having a thickness corresponding to first width Wa and a thickness corresponding to the second width Wb is discharged from the extrusion molding apparatus 1000 as a same time.

As illustrated in FIGS. 7 and 8, the light guide plate base 10 is discharged from the discharge portion 60 in the second direction (e.g., the Z-axis direction). The second direction is a direction crossing the first direction (e.g., the X-axis direction). In an exemplary embodiment, for example, the second direction crosses the first direction perpendicularly. In other words, the light guide plate base 10 is discharged from the discharge portion 60 in the Z-axis direction. A resin 380, which is a material for the light guide plate base 10, may be located between the first body 501 and the second body 502. The resin 380 may be located between facing surfaces of the first and second bodies 501 and 502, at the respective hanger 410, first land portion 411, manifold portion 420 and second land portion 412 thereof described above have different heights from each other. The facing surfaces of the first and second bodies 501 and 502 may form a cavity of the extrusion molding apparatus 1000 at which the resin 380 moves from an input thereof (e.g., resin injecting portion 50) to an output thereof (e.g., discharge portion 60). That is, the resin 380 may extend from an innermost portion (e.g., the hanger 410), to the discharge portion 60, to be extended outside the extrusion molding apparatus 1000 as the light guide base plate 10.

Figure 9:
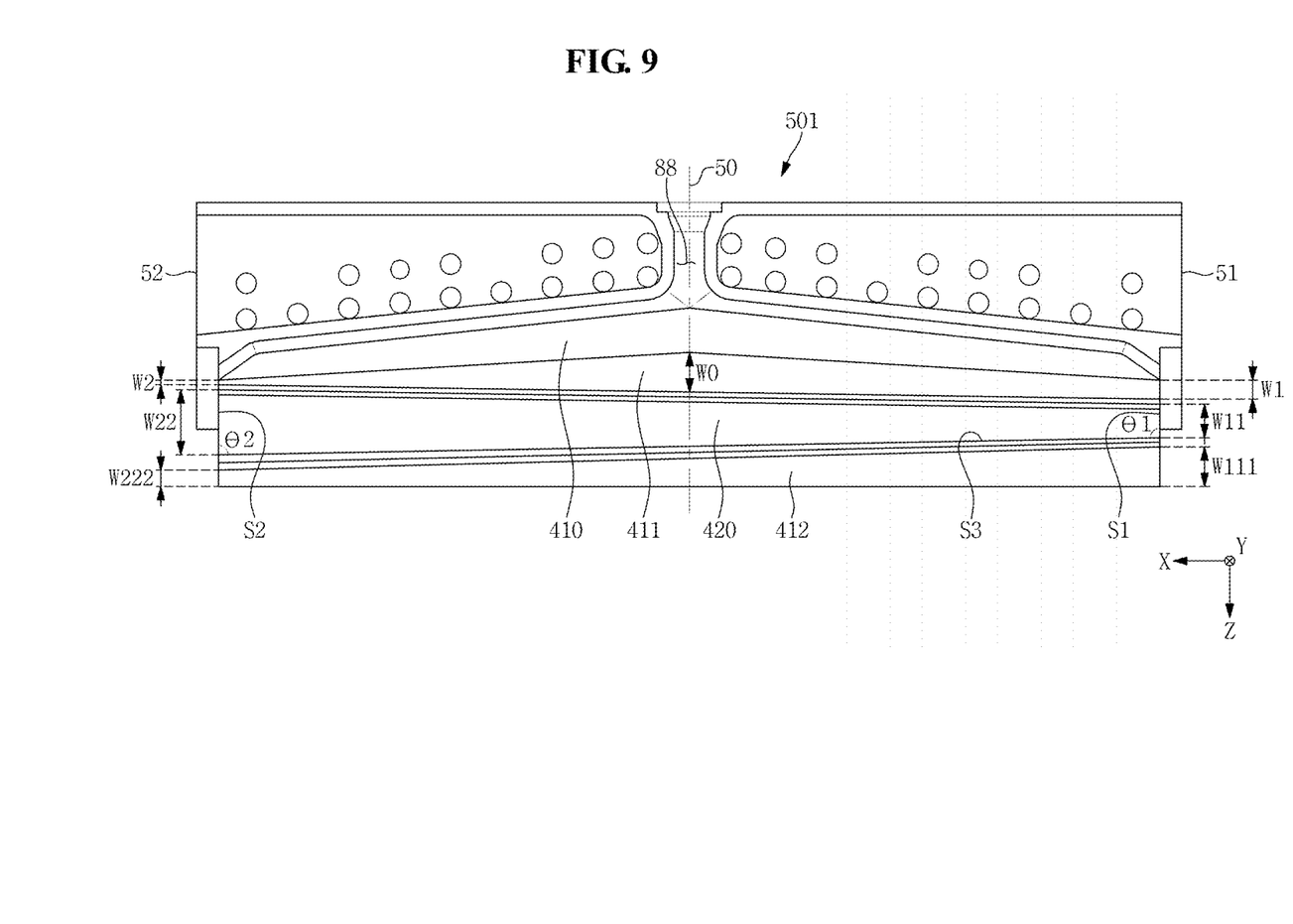
FIG. 9 is a top plan view illustrating the first body of FIG. 5.

FIG. 9 is a top plan view illustrating the first body 501 of FIG. 5.

Hereinafter, a direction from a central portion 50 of the first body 501 toward the first side surface 51 of the first body 501 is to be defined as a negative first direction, (e.g., direction opposite to the X-axis direction) and a direction from the central portion 50 of the first body 501 toward the second side surface 52 of the first body 501 is to be defined as the first direction (e.g., X-axis direction). The central portion 50 may be defined corresponding to a location of the light guide plate to be formed, which is between the largest thickness thereof and the smallest thickness thereof.

From the central portion 50 to respective ends thereof, the first land portion 411 has a width which gradually decreases along the first direction and has a width which gradually decreases along the negative first direction. In such an exemplary embodiment, a width W1 of the first land portion 411 at the first side surface 51 is larger than a width W2 of the first land portion 411 at the second side surface 52. In an exemplary embodiment, the first land portion 411 has a largest or maximum width W0 at the central portion 50. In other words, the width W0 of the first land portion 411 at the central portion 50 is larger than the width W1 of the first land portion 411 at the first side surface 51. In addition, the width W0 of the first land portion 411 at the central portion 50 is larger than the width W2 of the first land portion 411 at the second side surface 52. That is, for the first land portion 411, a planar area thereof defined by dimensions in the X-axis and Z-axis directions, decreases as a distance from the central portion 50 increases.

The manifold portion 420 has a width which gradually increases along the first direction. In other words, the manifold portion 420 has a width which gradually increases along the X-axis direction. Accordingly, a width W22 of the manifold portion 420 at the second side surface 52 is larger than a width W11 of the manifold portion 420 at the first side surface 51. That is, for the manifold portion 420, a planar area thereof defined by dimensions in the X-axis and Z-axis directions, increases as a distance from the first side surface 51 increases.

As the manifold portion 420 has the width which gradually increases along the X-axis direction in such a manner, the resin 380 may move more in the first direction than in a direction opposite thereto. In other words, in an exemplary embodiment of manufacturing a light guide plate with the extrusion molding apparatus 1000, a moving velocity of the resin 380 flowing toward the second side surface 52 of the first body 501 from the central portion 50 thereof increases, and thus a relatively greater amount of resin 380 may be collected at a portion of the manifold portion 420 corresponding to the second side surface 52. In contrast, a moving velocity of the resin 380 flowing toward the first side surface 51 of the first body 501 from the central portion 50 thereof decreases, and thus a relatively less amount of resin 380 may be collected at a portion of the manifold portion 420 corresponding to the first side surface 51. Accordingly, a deviation between the amount of resin 380 near the first side surface 51 and the amount of resin 380 near the second side surface 52 increases such that a deviation between a thickness of the light guide plate base 10 near the first side surface 51 and a thickness of the light guide plate base 10 near the second side surface 52 may increase. Accordingly, the light guide plate LGP may have a normal triangular cross-section in a plane defined in the X-axis direction and the Y-axis direction. That is, a relatively large-size light guide plate LGP may be formed by one or more embodiment of the extrusion molding apparatus 100 to have a normal triangular cross-section.

Herein, an edge of the manifold portion 420 corresponding to the first side surface 51 of the first body 501 is to be defined as a first side S1, an edge of the manifold portion 420 corresponding to the second side surface 52 of the first body 501 is to be defined as a second side, and an edge of the manifold portion 420 adjacent to the second land portion 412 is to be defined as a third side S3. In such an exemplary embodiment, an angle θ1 between the first side S1 and the third side S3 may form an obtuse angle, and an angle θ2 between the second side S2 and the third side S3 may form an acute angle. Accordingly, in the top plan view, the third side S3 may have a slope which gradually lowers toward the second side surface 52. Accordingly, the moving velocity of the resin 380 flowing toward the second side surface 52 of the first body 501 may increase as described above.

The second land portion 412 has a width which gradually decreases along the first direction. In other words, the second land portion 412 has a width which gradually decreases along the X-axis direction. Accordingly, a width W111 of the second land portion 412 at the first side surface 51 is larger than a width W222 of the second land portion 412 at the second side surface 52.

Respective widths of the first land portion 411, the manifold portion 420 and the second land portion 412 described above represent a width in the second direction. In other words, in the top plan view, the width of the first land portion 411 means a dimension or size of the first land portion 411 measured in the Z-axis direction, the width of the manifold portion 420 means a dimension or size of the manifold portion 420 measured in the Z-axis direction, and the width of the second land portion 412 means a dimension or size of the second land portion 412 measured in the Z-axis direction.

In an exemplary embodiment, although not illustrated, the first land portion, the manifold portion and the second land portion of the second body 502 may have structures as those illustrated in FIG. 9.

Figure 10:
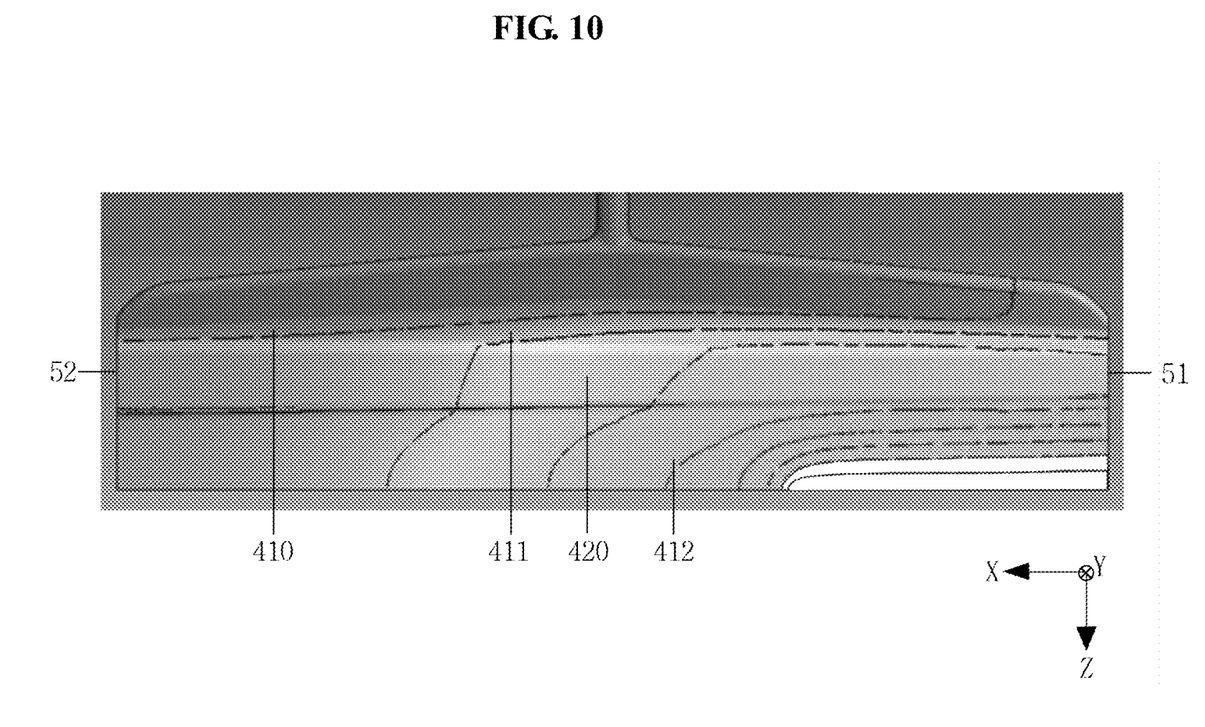
FIG. 10 is a view illustrating a thermal map indication positions of a resin located at a hanger, a first land portion, a manifold portion and a second land portion of the first body of FIG. 9.

FIG. 10 is a view illustrating a thermal map indication positions of a resin located at a hanger, a first land portion, a manifold portion and a second land portion of the first body of FIG. 9.

In FIG. 10, a temperature of the resin (material) 380 may be classified by color or relative color. That is, a portion of the resin 380 has a higher temperature by the shading in FIG. 10 being darker relative to other portions of the resin 380.

The shading indicating portions of the resin 380 has a gradually darkening color along the X-axis direction. In other words, the resin 380 has a temperature which gradually increases along the X-axis direction. As the temperature becomes higher, the moving velocity of the resin 380 increases. In other words, the moving velocity of the resin flowing toward the second side surface 52 of the first body 501 is higher.

As set forth hereinabove, the light guide plate extrusion molding apparatus according to one or more exemplary embodiments may have the following effects.

A manifold portion has a width in a top plan view which gradually increases along a direction from a first side surface of a first body toward a second side surface of the first body, thereby increasing a deviation between an amount of resin at an area corresponding to the first side surface and an amount of resin at an area corresponding to the second side surface. Accordingly, a deviation between a thickness of a light guide plate base near the first side surface and a thickness of the light guide plate base near the second side surface may also increase. Accordingly, a light guide plate may have a normal triangular cross-section.

While the invention has been illustrated and described with reference to the exemplary embodiments thereof, it will be apparent to those of ordinary skill in the art that various changes in form and detail may be formed thereto without departing from the spirit and scope of the invention.

What is claimed is:

1. An extrusion molding apparatus for a light guide plate of a display device, comprising:
 a first body and a second body facing each other, disposing a first surface of the first body facing a second surface of the second body, the first body including a first side surface disposed opposite to a second side surface thereof in a first direction, and
 a gap defined between the first and second surfaces facing each other, from which a light guide plate material forming the light guide plate of the display device is discharged from the extrusion molding apparatus along a second direction crossing the first direction;

wherein in the second direction, each of the first and second surfaces includes, in order:
  a hanger portion;
  a first land portion disposed at a height different from a height of the hanger;
  a manifold portion disposed at a height different from the height of the first land portion; and
  a discharge portion from which the light guide plate material is discharged from the extrusion molding apparatus, and along the first direction,
  the gap at the discharge portion increases, and
  a width of the manifold portion in the second direction increases.

2. The extrusion molding apparatus for a light guide plate of a display device as claimed in claim 1, wherein from a central portion of the first body in the first direction, a width of the first land portion in the second direction decreases along the first direction and along a direction opposite to the first direction.

3. The extrusion molding apparatus for a light guide plate of a display device as claimed in claim 1, wherein a width of the first land portion in the second direction at the first side surface of the first body is larger than a width of the first land portion in the second direction at the second side surface of the first body.

4. The extrusion molding apparatus for a light guide plate of a display device as claimed in claim 1, wherein along the first direction, a width of the second land portion in the second direction decreases.

5. The extrusion molding apparatus for a light guide plate of a display device as claimed in claim 1, wherein
  the manifold portion comprises a first side corresponding to the first side surface of the first body, a second side corresponding to the second side surface of the first body, and a third side adjacent to the second land portion in the second direction, and
  in a top plan view, an angle between the first side and the third side of the manifold portion is an obtuse angle.

6. The extrusion molding apparatus for a light guide plate of a display device as claimed in claim 5, wherein in the top plan view, an angle between the second side and the third side of the manifold portion is an acute angle.

7. The extrusion molding apparatus for a light guide plate of a display device as claimed in claim 1, wherein the hanger of one of the first and second bodies is closer to the other one of the first and second bodies than the first land portion to be located higher than the first land portion.

8. The extrusion molding apparatus for a light guide plate of a display device as claimed in claim 1, wherein the first land portion of one of the first and second bodies is closer to the other one of the first and second bodies than the manifold portion to be located higher than the manifold portion.

9. The extrusion molding apparatus for a light guide plate of a display device as claimed in claim 1, wherein the second land portion of one of the first and second bodies is closer to the other one of the first and second bodies than the manifold portion to be located higher than the manifold portion.

10. The extrusion molding apparatus for a light guide plate of a display device as claimed in claim 1, further comprising:

a first side cover located on the first side surface of the first body; and
a second side cover located on the second side surface of the first body.

11. An extrusion molding apparatus for a light guide plate of a display device, comprising:
  a first end thereof disposed opposite to a second end thereof in a first direction corresponding to a direction in which a thickness of the light guide plate of the display device increases; and
  a first body and a second body facing each other to define a gap therebetween from which a light guide plate material forming the light guide plate of the display device is discharged from the extrusion molding apparatus in a second direction crossing the first direction, wherein
  the first body includes a first surface thereof which faces the second body with the gap therebetween, the first surface of the first body including:
    a discharge portion from which the light guide plate material is discharged from the extrusion molding apparatus; and
    a manifold portion immediately preceding the discharge portion in a direction opposite to the second direction, the manifold portion disposed further from the second body than the discharge portion; and
  along the first direction from the first end of the extrusion molding apparatus to the second end thereof,
    the gap at the discharge portion increases, and
    a width of the manifold portion in the second direction increases.

12. The extrusion molding apparatus for a light guide plate of a display device as claimed in claim 11, wherein
  the first surface of the first body further includes a first land portion immediately preceding the manifold portion in the direction opposite to the second direction,
  the first land portion is closer to the second body than the manifold portion, and
  from a central portion of the first body in the first direction, a width of the first land portion in the second direction decreases along the first direction and along a direction opposite to the first direction.

13. The extrusion molding apparatus for a light guide plate of a display device as claimed in claim 11, wherein
  the first surface of the first body further includes a second land portion at the discharge portion immediately following the manifold portion,
  the second land portion is closer to the second body than the manifold portion, and
  along the first direction, a width of the second land portion in the second direction decreases.

14. A method of forming a light guide plate of a display device using an extrusion molding apparatus, the method comprising:
  defining a first end of the extrusion molding apparatus opposite to a second end thereof in a first direction corresponding to a direction in which a thickness of the light guide plate of the display device increases,
  disposing a first body and a second body of the extrusion molding apparatus facing each other to define a gap therebetween from which a light guide plate material forming the light guide plate is discharged from the extrusion molding apparatus in a second direction crossing the first direction, inputting the light guide plate material through a single opening in the extrusion molding apparatus which is connected to the gap between the first and second bodies facing each other, from a location of the single opening, moving the input light guide plate material within the gap at a manifold portion surface of the first body, in the first direction towards the second end of the extrusion molding apparatus and in a direction opposite to the first direction towards the first end of the extrusion molding apparatus, and providing the moved light guide plate material from the gap at the manifold portion surface to the gap at a discharge portion surface immediately following the manifold portion surface in the second direction, and discharging the moved light guide plate material from the gap at the discharge portion surface to outside the extrusion molding apparatus, in the second direction, wherein the moving the light guide plate material at the manifold portion surface of the first body provides more light guide plate material to the gap at the discharge portion surface at the second end of the extrusion molding apparatus than to the gap at the discharge portion surface at the first end of the extrusion molding apparatus.

15. The method of forming a light guide plate of a display device as claimed in claim 14, wherein along the first direction corresponding to the direction in which the thickness of the light guide plate of the display device increases, the gap at the discharge portion surface increases from the first end of the extrusion molding apparatus to the second end thereof, and a width of the manifold portion surface in the second direction, increases.

16. The method of forming a light guide plate of a display device as claimed in claim 14, wherein the gap at the discharge portion surface is smaller than the gap at the manifold portion surface.

* * * * *